United States Patent [19]
Fitzpatrick et al.

[11] Patent Number: 5,835,625
[45] Date of Patent: Nov. 10, 1998

[54] METHOD AND APPARATUS FOR OPTICAL CHARACTER RECOGNITION UTILIZING PROPORTIONAL NONPREDOMINANT COLOR ANALYSIS

[75] Inventors: Gregory P. Fitzpatrick, Fort Worth; Marvin L. Williams, Lewisville, both of Tex.

[73] Assignee: International Business Machines Corporation, Armonk, N.Y.

[21] Appl. No.: 10,967

[22] Filed: Jan. 29, 1993

[51] Int. Cl.⁶ ............... G06K 9/62
[52] U.S. Cl. ........... 382/165; 382/191; 382/227; 382/228
[58] Field of Search ............... 382/17, 36, 16, 382/25, 28, 11, 18, 1, 7

[56] References Cited

U.S. PATENT DOCUMENTS

| | | | |
|---|---|---|---|
| Re. 31,692 | 10/1984 | Tyburski | 382/7 |
| 3,786,237 | 1/1974 | Postal | 382/11 |
| 3,938,088 | 2/1976 | Clark | 382/17 |
| 3,949,363 | 4/1976 | Holm | 382/7 |
| 4,637,051 | 1/1987 | Clark | 382/1 |
| 4,987,603 | 1/1991 | Ohnishi | 382/25 |
| 5,239,592 | 8/1993 | Kameyama et al. | 382/7 |

*Primary Examiner*—Leo Boudreau
*Assistant Examiner*—D. Richard Anderson, Jr.
*Attorney, Agent, or Firm*—Edward Duffield; Duke W. Yee; Andrew J. Dillon

[57] ABSTRACT

A method and apparatus for optical identification an unknown character from a plurality of known characters. Each of the known characters includes a predominant color and a nonpredominant color in preselected proportions. The unknown character has at least one geometric feature and a plurality of pixels including a predominant color and a nonpredominant color. The method and apparatus of the present invention include an examination of at least one geometric feature of the unknown character. A hypothetical identity for the unknown character is generated in response to the examination of at least one geometric feature of the unknown character. A portion of the plurality of pixels of the unknown character is sampled and a proportion between the predominant color and the nonpredominant color within the sampled portion of the plurality of pixels is determined from the sampled pixels. A comparison of the determined proportion with a preselected proportion associated with a known character corresponding to the hypothetical identity is made. The hypothetical identity is assigned to the unknown character if the determined proportion falls within the preselected range of the preselected proportion for the known character corresponding to the hypothetical identity.

9 Claims, 5 Drawing Sheets

METHOD AND APPARATUS FOR OPTICAL CHARACTER RECOGNITION UTILIZING PROPORTIONAL NONPREDOMINANT COLOR ANALYSIS

CROSS-REFERENCE TO RELATED APPLICATION

The present application is related to U.S. patent application Ser. No. 08/010,922, abandoned in favor of continuing application Ser. No. 08/406,276, entitled "Method and Apparatus For Optical Character Recognition Utilizing Combinatorial Hypothesis Testing" filed of even date herewith by the inventors hereof, assigned to the assignee herein, and incorporated herein by reference.

BACKGROUND OF THE INVENTION

1. Technical Field

The present invention relates in general to optical character recognition, and in particular to a method and apparatus for optical character recognition of characters having different color attributes. Still more particularly, the present invention relates to a method and apparatus for optical character recognition of characters having different color attributes utilizing both geometric optical character recognition and color coded optical character recognition techniques.

2. Description of the Related Art

Optical character recognition (OCR) is a technique for character recognition that employs optical means to identify graphic characters. Devices such as an optical scanner or an optical reader may be utilized to input data into a data processing system for analysis or processing. "Scanning" of a document typically produces a bit map, which is a pixel-by-pixel representation of the overall image in a binary form. The bit map may be manipulated utilizing, for example, a painting application or image-editing software package. On the other hand, if the bit map image contains text, the text cannot be edited or accessed utilizing a word processing program or a spreadsheet application, since those applications do not recognize text in the form of bit mapped data. Typically, word processing or spreadsheet application packages recognize letters and numbers by utilizing a code called American Standard Code for Information Interchange (ASCII). Consequently, if a user desires to manipulate text in a bit map form, the scanned text must be converted into a form that is editable by a word processing or spreadsheet application package. Optical character recognition (OCR) technology is often employed to translate bit mapped text into a format that may be utilized by a word processing or spreadsheet application.

Conventional OCR techniques fall into two major categories: (1) geometric OCR or (2) color coded OCR. The first technique, Geometric OCR attempts to recognize a character based on the character's shape or the geometric representation of a set of pixels or dots. A "character", as utilized herein, is meant to include a printed or written symbol that may be recognized by an OCR device, such as an optical scanner or reader, or by a human reader. The character may be an alphabetical symbol or an icon. Furthermore, the terms "pixel" and "dot" are utilized interchangeably herein to describe a distinguishable point recognizable by an OCR device. In a geometric OCR approach, color is utilized only to define the shape of a character. Even if characters are represented by multiple colors, the multiple colors are converted to either black or a gray scale before shape analysis occurs. Although the geometric OCR approach may provide a recognition accuracy as high as 99.5%, character recognition errors still occur due to character shape defects and character shape variations. Character shape defects may take the form of smudged characters or improperly formed characters. Character shape variations may take the form of character fonts other than those character fonts that the OCR device is designed to recognize.

The second OCR technique, color coded OCR, attempts to recognize a character based on the character's color. In such an approach, colored pixels are employed not only to indicate the shape of a character, but also to indicate the identity of the character. For example, an "A" is printed red, "B" is printed blue, and "C" is printed yellow. Color coded OCR techniques are not subject to the shape processing errors typically found with geometric OCR techniques because color coded OCR techniques do not perform shape processing. Color coded OCR techniques, however, may be subject to color processing errors. Such color processing errors may take the form of ink color shifts, improper color density, improper color intensity, or color optical scanner misalignment.

Therefore, it would be desirable to have a method and system for OCR that can increase the accuracy rate of OCR techniques while overcoming both the shape processing error deficiency of geometric OCR techniques and the color processing error deficiency of color coded OCR techniques.

SUMMARY OF THE INVENTION

It is therefore one object of the present invention to provide an improved method and system for optical character recognition.

It is another object of the present invention to provide a method and apparatus for optical recognition of characters having different color attributes.

It is yet another object of the present invention to provide a method and apparatus for optical character recognition of characters having different color attributes utilizing both geometric optical character recognition and color coded optical character recognition techniques.

The foregoing objects are achieved as is now described. The present invention permits optical identification an unknown character from a plurality of known characters. Each of the known characters includes a predominant color and a nonpredominant color in preselected proportions. The unknown character has at least one geometric feature and a plurality of pixels including a predominant color and a nonpredominant color. The method and apparatus of the present invention includes an examination of at least one geometric feature of the unknown character. A hypothetical identity for the unknown character is generated in response to the examination of at least one geometric feature of the unknown character. A portion of the plurality of pixels of the unknown character is sampled and a proportion between the predominant color and the nonpredominant color within the sampled portion of the plurality of pixels is determined from the sampled pixels. A comparison of the determined proportion with a preselected proportion associated with a known character corresponding to the hypothetical identity is made. The hypothetical identity is assigned to the unknown character if the determined proportion falls within a preselected range of a preselected proportion for the known character corresponding to the hypothetical identity.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
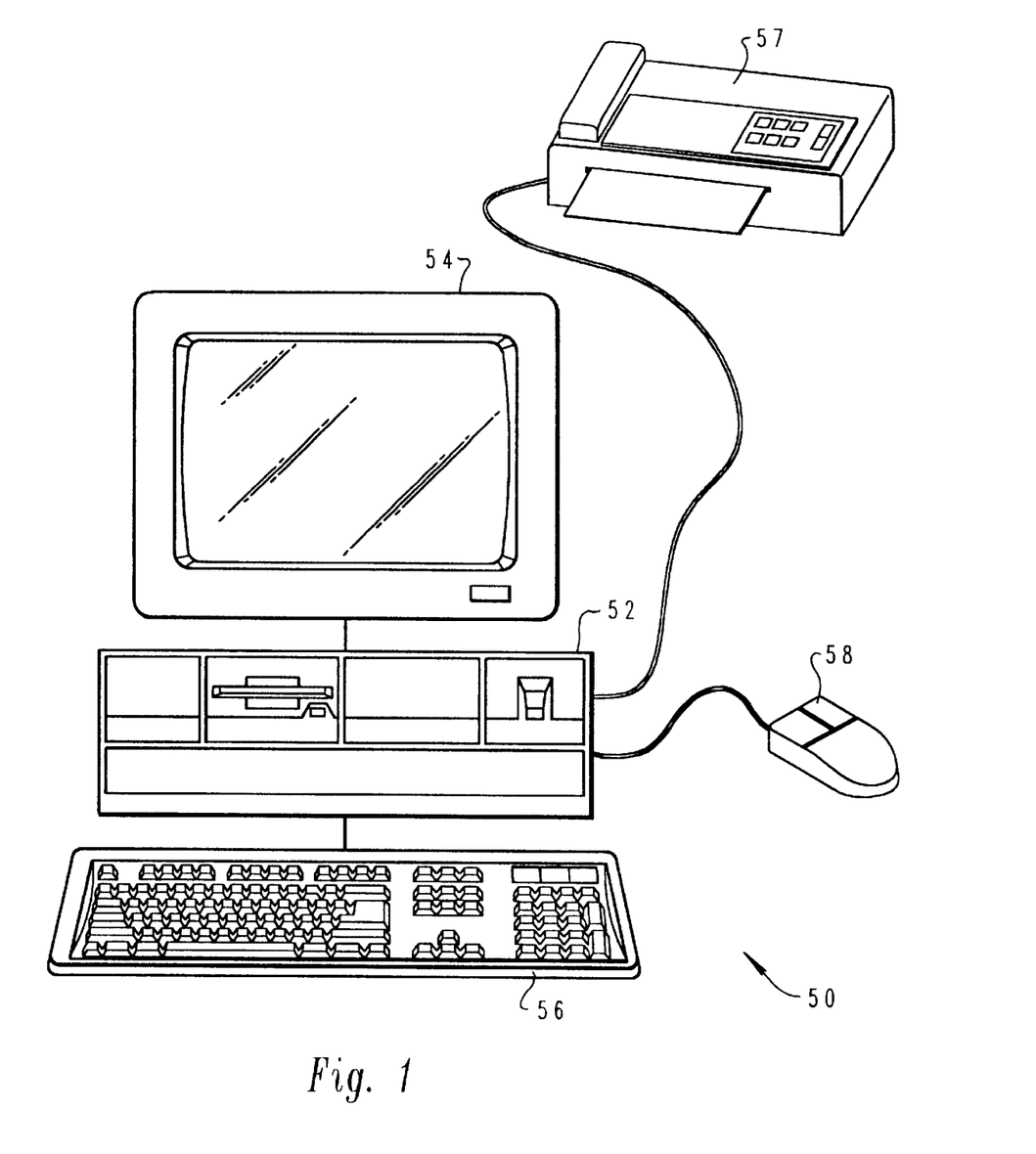
FIG. 1 is a pictorial representation of a data processing system that may be utilized to implement a method and system of the present invention.

With reference now to the figures and in particular with reference to FIG. 1, there is depicted a pictorial representation of a data processing system in which the present invention may be implemented in accordance with a preferred embodiment of the present invention. A personal computer 50 is depicted which includes a system unit 52, a video display terminal 54, a keyboard 56, a color optical scanner 57, and a mouse 58. Personal computer 50 may be implemented utilizing any suitable computer such as an IBM PS/2 computer, a product of International Business Machines Corporation, located in Armonk, N.Y. "PS/2" is a registered trademark of International Business Machines Corporation, located in Armonk, N.Y. Although the depicted embodiment involves a personal computer, a preferred embodiment of the present invention may be implemented in other types of data processing systems, such as for example, intelligent work stations or mini-computers.

Figure 2:
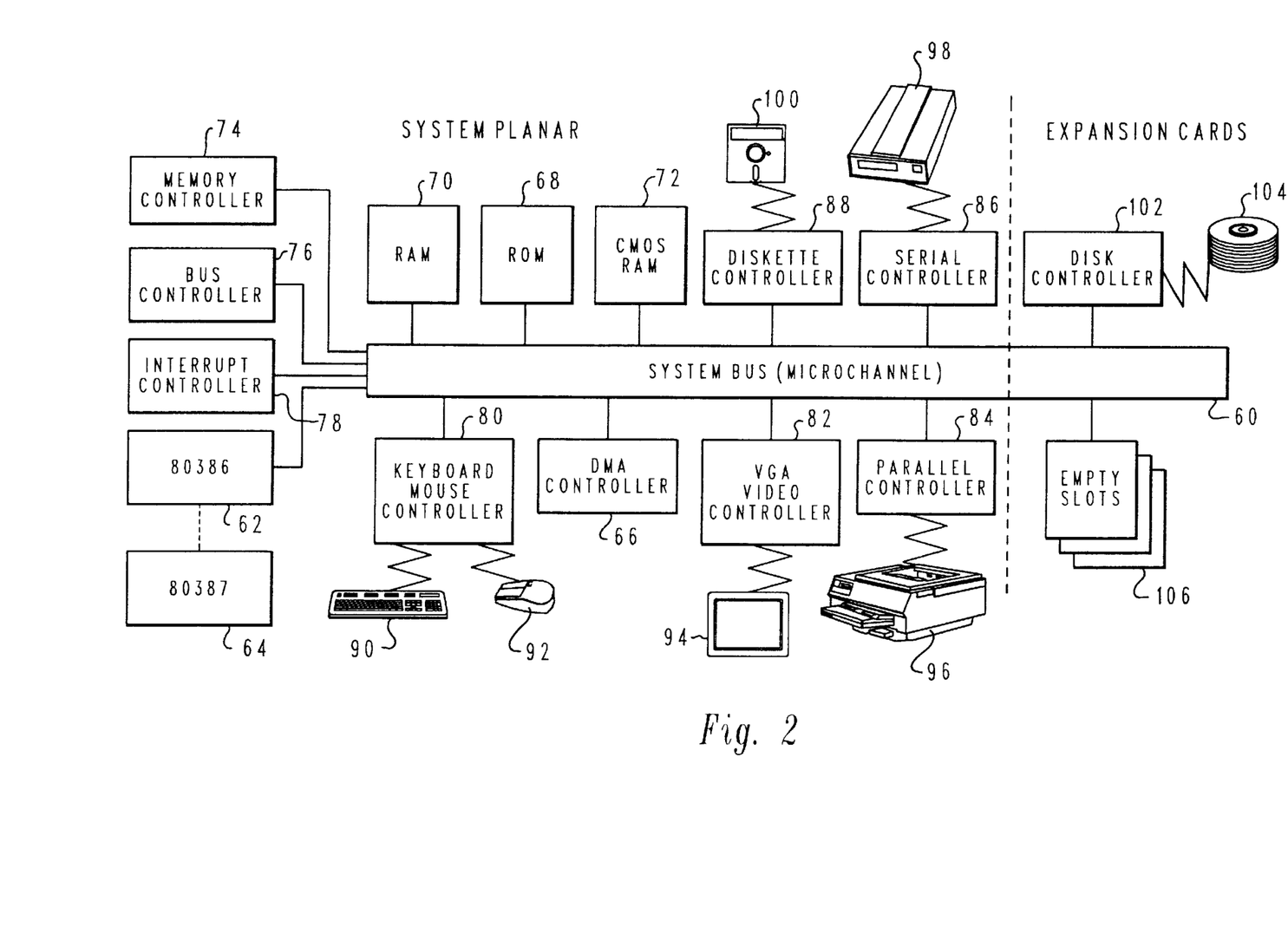
FIG. 2 depicts a block diagram of selected components of the data processing system illustrated in FIG. 1 in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from International Business Machines Corporation. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52. Empty slots 106 may include an adapter for controlling a scanning device, such as color optical scanner 57.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted.

The present invention provides a method and apparatus for identifying unknown characters utilizing a definite proportion of nonpredominant color to predominant color within an unknown character for identification. The proportion data may be utilized to reduce the sample size required to reach a specified confidence level to identify an unknown character. As a result, processing overhead associated with reaching a confidence level is reduced. In accordance with a preferred embodiment of the present invention, nonpredominant colors may be randomly placed in any location within a character. This placement may be particularly important for proportional font based characters where nonpredominant colors could become more humanly visible due to differing character sizes.

A technique of interlacing the attributes of predominant colored pixels within an unknown character with OCR distinguishable nonpredominant colored pixels is employed in accordance with a preferred embodiment of the present invention. The nonpredominant colored pixels need only be distinguishable by the OCR device or program and need not be distinguishable by human perception in accordance with a preferred embodiment of the present invention. Preferably, the characters may be perceived by a human observer as a single color. The present invention utilizes probabilistic techniques well known in the art to determine an unknown character's probable identity, a hypothesis or hypothetical identity, and then employs information about the nonpredominant color proportion to choose an appropriately small number of random samples for testing. The hypothesis is then tested via pixel sampling. As a result, normal geometric information about each unknown character is utilized to establish a hypothesis. A probability is calculated for the hypothesis utilizing the geometric information. This hypothesis is confirmed or denied utilizing color coded OCR analysis. In accordance with a preferred embodiment of the present invention, color attributes are detected from a random sample and analysis of this random sample serves to form a basis for confirming or denying the hypothesis generated by geometric OCR analysis.

For example, assume the geometric OCR analysis on an unknown character yields a 90% confidence or probability rate that the unknown character is an "A". The hypothesis contains a null hypothesis (H0) that the symbol is a letter "A" and a alternate hypothesis (H1) that the unknown character is not a letter "A". Confidence factors (probabilities) obtained from color coded OCR analysis are utilized to select either the null hypothesis or the alternate hypothesis.

Next, pixels, which comprise the unknown character, are randomly sampled to search for nonpredominant colored pixels, which may be utilized to confirm the null hypothesis to a given level of confidence. Assume that the letter "A" is comprised of 1000 pixels and that it has been determined that a nonpredominant color, blue, is interlaced with the predominant color, black. Previously, the OCR process would require a large number of random samples of pixels to detect enough blue pixels to confirm the null hypothesis to the degree specified. In accordance with a preferred embodiment of the present invention, the proportion of nonpredominant colored pixels (i.e., blue) associated with a character is utilized to reduce the sample size needed to detect a statistically expected number of blue pixels. The proportion of nonpredominant colored pixels to predominant colored pixels in the samples may be compared with a preselected proportion in a table. The correlation between the calculated proportion determined from sampling pixels and the table proportion determined by the identity hypothesized by the hypothesis may be utilized to determine whether to accept or reject for the hypothesis in accordance with a preferred embodiment of the present invention.

For example, assume that the letter "A" has a preselected proportion of 10% nonpredominant blue colored pixels. Assume that a random sampling of pixels within the unknown character results in a proportion of 11.5% blue pixels. The correlation between the two numbers may be utilized to determine a probability that the unknown character is indeed the letter "A". Until an identity of an unknown character, indicated by a hypothesis, is accepted or rejected, the identity is called a "hypothetical identity". If the sampled proportion of nonpredominant blue colored pixels deviates beyond a preselected range from the preselected proportion, e.g., ±2%, the hypothesis is rejected. Various ranges may be selected depending on factors, such as the applications and scanning devices employed in accordance with a preferred embodiment of the present invention.

Referring next to FIG. 3, a representation of the word "THE", composed of three characters "T" 501, "H" 511, and "E" 521 in the sampling sector 500, in accordance with a preferred embodiment of the present invention is depicted. In the predominant and nonpredominant color coded technique, each character is represented by a predominant color associated with the unknown character and a nonpredominant color associated with the unknown character. The predominant color is readily distinguishable by humans. The nonpredominant color is associated, interlaced, intermingled, or embedded within the predominant color. The nonpredominant color is preferably nondistracting to humans, but distinguishable by a color scanner. For example, the bodies of the characters "T" 501, "H" 511, and "E" 521 are all composed of a predominant color; i.e., black. The predominant color, black, is distinguishable by the human reader, and the characters appear black to a human reader.

The exploded view 503 of a portion of the body of the character "T" 501 illustrates a nonpredominant color 505, which may comprise the color red associated with character "T" 501. The nonpredominant color 505 is nondistracting to humans, but distinguishable by a device such as a color scanner. Nonpredominant color 505 is also associated, interlaced, intermingled, or embedded within the predominant color, black. The exploded view 513 of a portion of the body of the character "H" 511 illustrates a nonpredominant color 515, which may comprise the color brown associated with the character "H" 511. As above, the nonpredominant color 515 is nondistracting to humans, but distinguishable by a color scanner. Nonpredominant color 515 is also associated, interlaced, intermingled, or embedded predominant color, black. The exploded view 523 of a portion of the body of the character "E" 521 illustrates a nonpredominant color 525, which may comprise the color blue associated the character "E" 521. The nonpredominant color 525 is nondistracting to humans, but distinguishable by a color scanner. The nonpredominant color 525 also is associated, interlaced, intermingled, or embedded with the predominant black.

Figure 4:
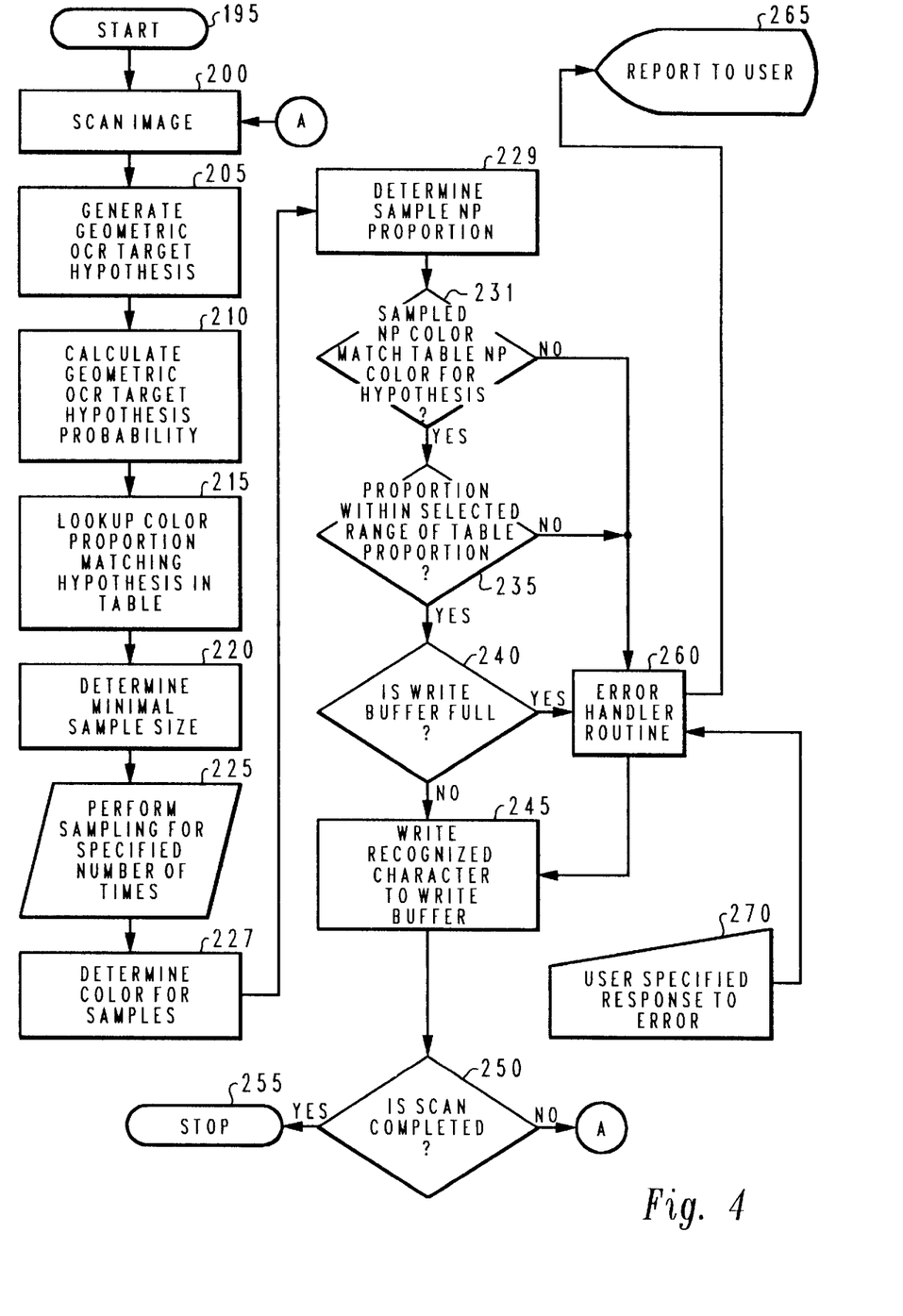
FIG. 4 depicts a flowchart illustrating a method and system for recognizing characters utilizing geometric and color criteria in accordance with a preferred embodiment of the present invention.

Referring now to FIG. 4, a flowchart illustrating a method and system for recognizing unknown characters utilizing geometric and color criteria, in accordance with a preferred embodiment of the present invention, is depicted. The process begins in block 195 and thereafter proceeds to block 200. Block 200 illustrates the scanning of a portion of an image which may or may not contain recognizable characters. Scanning may be accomplished by a color scanner in accordance with a preferred embodiment of the present invention.

Thereafter, the process proceeds to block 205, which depicts the generation of a geometric OCR target hypothesis utilizing known geometric OCR techniques in accordance with a preferred embodiment of the present invention. One or more hypotheses may be generated for a unknown character. A null hypothesis (H0) and an alternative hypothesis (H1) are generated in accordance with a preferred embodiment of the present invention. For example, the hypothesis may be whether or not the symbol is an "A". The null hypothesis (H0) may be, for example, that the unknown character is a letter "A". The alternative hypothesis (H1) may be, for example, that the unknown character is not an "A". The process then proceeds to block 210. Block 210 illustrates the calculation of a geometric OCR target hypothesis probability of an unknown character within the portion of the image being a particular target character. A probability for each hypothesis is then generated. For example, H0 may have a 90% probability and H1 may have a 10% probability in accordance with a preferred embodiment of the present invention. The process in block 210 further calculates these probabilities for other potential target characters.

Although only two hypotheses, H0 and H1, are generated in the depicted embodiment, other hypotheses and probabilities may be generated for an unknown character in accordance with a preferred embodiment of the present invention. For example, the process in block 210 may further calculate that there is a 30% probability that the unknown character is a "B", a 5% probability that the unknown character is a "C", etc.

The process then proceeds to block 215, which depicts looking up the specified nonpredominant color proportion in a color proportion table corresponding to the character indicated by geometric OCR target hypothesis, in accordance with a preferred embodiment of the present invention. Table I below depicts information that may be found in a color proportion table in accordance with a preferred embodiment of the present invention:

TABLE I

| Character | Nonpredominant Color | Proportion of Nonpredominant Color (percent) |
|---|---|---|
| A | Blue | 10 |
| a | Blue | 7 |
| B | Green | 10 |
| b | Green | 7 |
| C | Red | 10 |
| c | Red | 6 |
| D | Blue | 14 |
| d | Blue | 3 |

For example, if the hypothesis H0 is that the unrecognized character is a letter "A". Searching the color proportion table illustrated in Table I for the character "A", for example, reveals that the character "A" has 10% blue pixels as the nonpredominant color and that proportion of blue pixels within the character "A" is 10%. Next, the process proceeds to block 220. Block 220 illustrates the determination of the minimal sample size. The process then advances to block 225, which depicts sampling pixels within the unknown character for the number of times specified by the minimal sample size.

The process then proceeds to block 227. Block 227 illustrates a determination of the color for each pixel sampled. Identification of nonpredominant colors and predominant colors also is performed in this block. Thereafter, the process proceeds to block 229 which depicts the calculation of the proportion of nonpredominant colors (NP) to predominant colors in the pixels sampled. Afterward, the process advances to block 231. Block 231 illustrates a determination of whether or not the sampled nonpredominant color matches the nonpredominant color for the character indicated by the geometric OCR target hypothesis. If the colors do not match, the process proceeds to block 260 for handling of errors. Error handling is described in more detail below.

Referring back to block 231, if the sampled nonpredominant color matches the nonpredominant color for the character indicated by the geometric OCR target hypothesis, the process then advances to block 235. Block 235 depicts a determination of whether or not the determined proportion is within a preselected range of the table proportion for the character indicated by the geometric OCR target hypothesis. If the determined proportion is within a selected range, e.g., ±2%, the process proceeds to block 240. Block 240 depicts a determination of whether or not the write buffer is full. The write buffer is the buffer in which the program writes a sequence of recognized characters in accordance with a preferred embodiment of the present invention. If the write buffer is not full, the process then proceeds to block 245, which depicts the writing of the recognized character to the write buffer. Thereafter, the process proceeds to block 250. Block 250 illustrates a determination of whether or not the scan is complete. If the scan is complete, the process terminates in block 255 as illustrated. If, however, the scan is incomplete the process returns to block 200 for further scanning of the image.

Referring back to block 240, if the write buffer is full, the process proceeds to block 260, which depicts the processing of the exception by an error or exception handler routine well known to those skilled in the art. A default process of the error handler routine in block 355 is to transfer the contents of the write buffer to an output file, and to clear the write buffer. The error handler routine may also report the error to a user through output device 360. In lieu of the default action, the process in block 260 may execute a user specified response to an error, such as designating an output file as specified by the user through input device 365. Thereafter, the process returns to block 245 for the writing of the recognized character to the write buffer.

Referring again to block 235, if the determined proportion is not within the selected range of the table proportion, the process also proceeds to block 260 for handling of the error.

Figure 5:
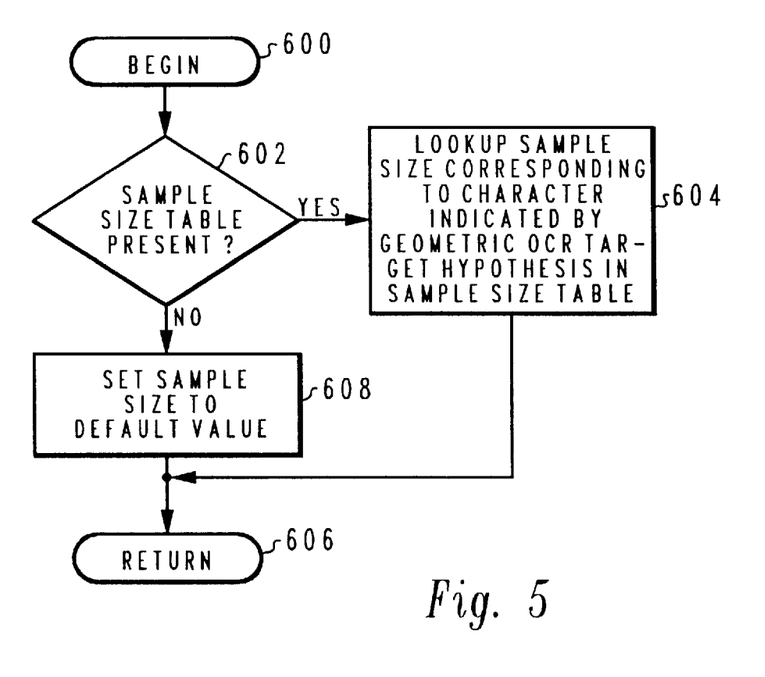
FIG. 5 is a flowchart illustrating the determination of a sample size in accordance with a preferred embodiment of the present invention.

Referring now to FIG. 5, a flowchart illustrating a method and system for determining the minimal sample size in block 220 of FIG. 4. The process begins as illustrated in block 600 and thereafter proceeds to block 602. Block 602 depicts a determination of whether or not a sample size table is present. If a sample size table is present, the process proceeds to block 604, which illustrates a lookup of the sample size corresponding to the character indicated by the geometric OCR target hypothesis in the sample size table. Thereafter the process returns in block 606. Referring back to block 602, if a sample size table is not present, the process then advances to block 608. Block 608 illustrates setting the sample size to a predetermined default value. Again, the process returns in block 606.

The present invention provides an advantage of increased accuracy in OCR through the use of both geometric and color analysis. Additionally, the speed of OCR is increased since the sample needed to reach a specified confidence level may be reduced utilizing a color proportion table in accordance with a preferred embodiment of the present invention. Utilizing the color proportion table in accordance with a preferred embodiment of the present results in a reduction of the number of pixels that must be sampled in order to confirm a hypothesis.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for optically identifying an unknown character from a plurality of known characters, each of said plurality of known characters including a predominant color and a nonpredominant color in preselected proportions and wherein said unknown character is comprised of at least one geometric feature and a plurality of pixels including a predominant color and a nonpredominant color, said method comprising the data processing system implemented steps of:

generating data using an optical scanning device to scan said unknown character, wherein said data includes at least one geometric feature and a plurality of pixels including a predominant color and a nonpredominant color of said unknown character;

examining said at least one geometric feature of said unknown character using said data;

generating a hypothetical identity for said unknown character in response to said examination of said at least one geometric feature using said data;

sampling a portion of said plurality of pixels of said unknown character from said data and determining a proportion between said predominant color and said nonpredominant color within said sampled portion of said plurality of pixels;

comparing said determined proportion with a preselected proportion for an associated one of said plurality of known characters corresponding to said hypothetical identity; and assigning said hypothetical identity to said unknown character if said determined proportion falls within a preselected range of said preselected proportion for said one of said plurality of known characters, wherein said unknown character may be identified.

2. The method for optically identifying an unknown character according to claim 1, further comprising determining whether said nonpredominant color of said unknown character corresponds to a nonpredominant color for said associated one of said plurality of known characters corresponding to said hypothetical identity; and wherein said step of assigning said hypothetical identity to said unknown character if said determined proportion falls within a preselected range of said preselected proportion for said one of said plurality of known characters is performed only if said nonpredominant color of said unknown character corresponds to said nonpredominant color for said associated one of said plurality of known characters corresponding to said hypothetical identity.

3. The method of claim 1, wherein said nonpredominant color is associated with at least two noncontiguous pixels in said unknown character.

4. The method of claim 1, wherein said nonpredominant color is associated with pixels randomly dispersed within said unknown character.

5. A data processing system for optically identifying an unknown character from a plurality of known characters, each of said plurality of known characters including a predominant color and a nonpredominant color in preselected proportions and wherein said unknown character is comprised of at least one geometric feature and a plurality of pixels including a predominant color and a nonpredominant color, said data processing system comprising:

an optical scanning device, wherein said optical scanner optically scans an unknown character to produce data including at least one geometric feature of the unknown character and a plurality of pixels including a predominant color and a nonpredominant color from the unknown character in response to optically scanning said unknown character;

a memory for storing said data produced by said optical scanning device;

examination means for examining said at least one geometric feature of said unknown character using said data located in said memory;

generation means for generating a hypothetical identity for said unknown character in response to said examination of said at least one geometric feature;

sampling means for sampling a portion of said plurality of pixels of said unknown character and determining a proportion between said predominant color and said nonpredominant color within said sampled portion of said plurality of pixels;

comparison means for comparing said determined proportion with a preselected proportion for an associated one of said plurality of known characters corresponding to said hypothetical identity; and assignment means for assigning said hypothetical identity to said unknown character if said determined proportion falls within a preselected range of said preselected proportion for said one of said plurality of known characters.

6. The data processing system of claim 5, further comprising determination means for determining whether said nonpredominant color of said unknown character corresponds to a nonpredominant color for said associated one of said plurality of known characters corresponding to said hypothetical identity; and wherein said assignment means is utilized only if said nonpredominant color of said unknown character corresponds to said nonpredominant color for said associated one of said plurality of known characters corresponding to said hypothetical identity.

7. The data processing system of claim 6, further comprising storage means for storing data representing said predominant color, said nonpredominant color and said proportions of predominant color and nonpredominant color for said plurality of known characters.

8. The apparatus of claim 5, wherein said nonpredominant color is associated with at least two noncontiguous pixels in said unknown character.

9. The method of claim 5, wherein said nonpredominant color is associated with pixels randomly dispersed within said unknown character.

* * * * *

UNITED STATES PATENT AND TRADEMARK OFFICE
CERTIFICATE OF CORRECTION

PATENT NO. : 5,835,625
DATED : November 10, 1998
INVENTOR(S) : *Fitzpatrick et al.*

It is certified that error appears in the above-identified patent and that said Letters Patent is hereby corrected as shown below:

In col. 3, line 13, please delete "FIG. 3 is" and insert --Figures 3A-D illustrate--.

Figure 3A:
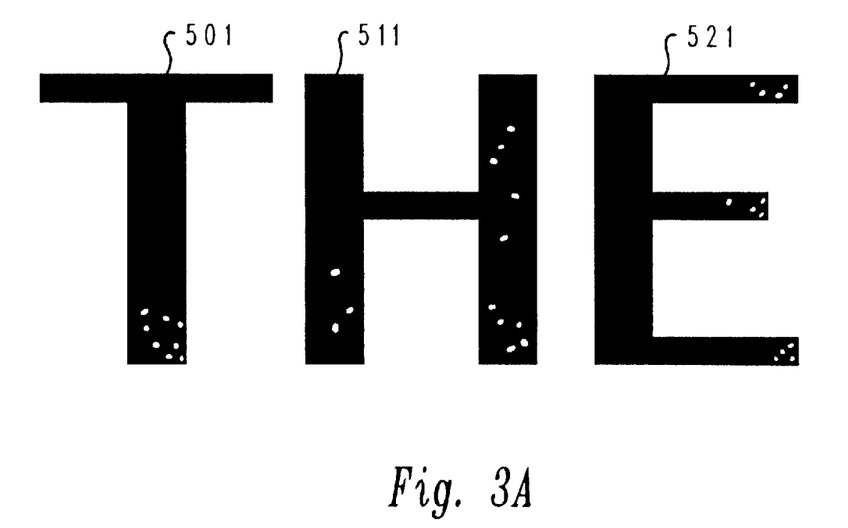
FIG. 3 is a color coded technique of representing characters in accordance with a preferred embodiment of the present invention.
Figure 3B:
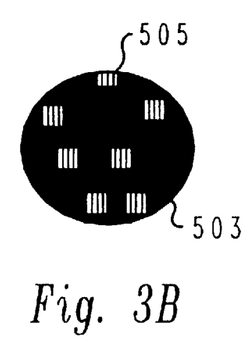
Figure 3C:
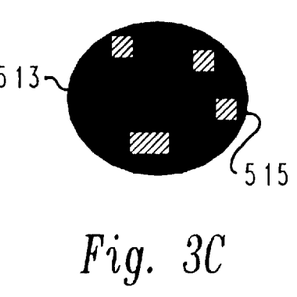
Figure 3D:
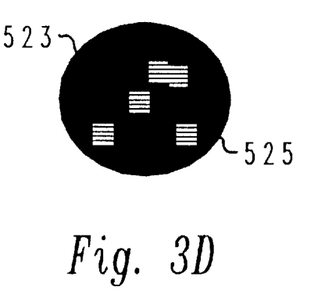

In col. 5, line 47, please delete "FIG. 3" and insert --FIG. 3A--.

In col. 5, line 66, after "501", please insert --, as depicted in Figure 3B,--.

In col. 6, line 6, after "511", please insert --, as depicted in Figure 3C,--.

In col. 6, line 14, after "521", please insert --, as depicted in Figure 3D,--.

Signed and Sealed this

Twenty-second Day of June, 1999

*Attest:*

Q. TODD DICKINSON

*Attesting Officer*     *Acting Commissioner of Patents and Trademarks*